United States Patent [19]

Schumacher

[11] 4,084,024

[45] Apr. 11, 1978

[54] PROCESS FOR THE PRODUCTION OF SILICON OF HIGH PURITY

[75] Inventor: Joseph C. Schumacher, Los Angeles, Calif.

[73] Assignee: J. C. Schumacher Co., Oceanside, Calif.

[21] Appl. No.: 745,861

[22] Filed: Nov. 29, 1976

Related U.S. Application Data

[63] Continuation-in-part of Ser. No. 630,305, Nov. 10, 1975, abandoned.

[51] Int. Cl.$^2$ ............................................. C01B 33/02
[52] U.S. Cl. .................. 427/215; 427/248 A; 423/342; 423/350; 423/486; 423/648 R
[58] Field of Search ............... 423/350, 486, 488, 500, 423/342, 648; 427/213, 215, 216, 217, 248 A

[56] References Cited

U.S. PATENT DOCUMENTS

| | | | |
|---|---|---|---|
| 2,912,311 | 11/1959 | Mason | 423/350 X |
| 3,012,861 | 12/1961 | Ling | 427/213 X |
| 3,016,291 | 1/1962 | Anes | 423/350 |
| 3,020,128 | 2/1962 | Adcock et al. | 423/350 |
| 3,091,517 | 5/1963 | Short et al. | 423/342 |
| 3,963,838 | 6/1976 | Setty et al. | 423/350 X |

*Primary Examiner*—Jack Cooper
*Attorney, Agent, or Firm*—Keith D. Beecher

[57] ABSTRACT

A process is provided for the low cost, high volume production of polycrystalline high purity silicon by a vapor phase reduction of a halosilane, with hydrogen, the resulting polycrystalline silicon being particularly suited for use in the production of single crystal silicon for the manufacture of semiconductor devices, solar cells, and the like. The process of the invention involves the reaction of metallurgical grade silicon (of a purity of about 98%) with a halogen or hydrogen halide to form a halosilane intermediate; the purification of the halosilane and of hydrogen; the separate pre-heating of the purified halosilane and of the purified hydrogen to a temperature range above the chemical reaction temperature of the halosilane and the hydrogen; injection of the halosilane and the hydrogen into a continuous flow reduction tubular reactor wherein the feed materials are instantaneously mixed in a manner which causes chemical reaction to be initiated followed by nucleation and growth of solid high purity silicon particles as the reaction mass flows through the tubular reactor; introduction of the solid-gas reaction mass stream into a cyclone type separator wherein the high purity silicon particles are collected and separated from the gas stream and ejected from the bottom of pg,2 the separator; emitting the gas stream from the top of the separator and conducting the gas stream to a condenser-scrubber system wherein unreacted hydrogen is separated and then recycled to the hydrogen pre-heater for re-use, unreacted silicon halosilane is separated and recycled to the intermediate pre-heater for re-use, and reaction product hydrogen halide is separated and recycled to the silicon halosilane generator for re-use.

11 Claims, 3 Drawing Figures

PROCESS FOR THE PRODUCTION OF SILICON OF HIGH PURITY

This application is a continuation-in-part of copending application Ser. No. 630,305, which was filed Nov. 10, 1975 in the name of the present inventor now abandoned.

BACKGROUND OF THE INVENTION

The term halosilane as used in the present specification includes any one or more of the following: $SiX_4$, $HSiX_3$, $H_2SiX_2$ and $H_3SiX$, and is represented by the general chemical formula $H_nSiX_{(4-n)}$ where X represents Cl, Br or I.

Recent developments in the semiconductor industry have created a growing demand for low cost single crystal silicon of extremely high purity, which is known as semiconductor grade silicon. Semiconductor grade silicon is used in the manufacture of semiconductor devices, such as transistors, rectifiers, solar cells and the like. Processes are in use in the prior art for the production of polycrystalline semiconductor grade silicon, which can be converted into single crystal semiconductor grade silicon by means of special techniques, such as by the well known Czochralski method.

In one such prior art process, for example, silicon tetraiodide is purified by crystallization, and vaporized, the vapor being subsequently caused to deposit silicon on a hot wire of a relative inert metal, such as tungsten. In such a prior art process, because of the difference in volatility of silicon and iodine, the reaction product iodine vapor diffuses away from the space near the heated wire, and the silicon is deposited on the heated wire and grows to form a substantial silicon crystalline mass. When the growth reaches a certain stage, the cooled mass of crystalline silicon is cut in layers from the wire substrate.

Another prior art process for the preparation of polycrystalline semiconductor grade silicon includes the reaction of super-heated silicon tetrachloride of high purity with highly heated vapor of zinc, causing an interaction of the zinc vapor and the silicon tetrachloride. A heated silicon substrate is provided, and the zinc vapor and silicon tetrachloride cause elemental silicon to grow on the heated silicon substrate to provide polycrystalline elemental silicon which, under suitable conditions, is at least partially of simiconductor grade.

Semiconductor grade polycrystalline silicon has also been produced in the prior art by the reduction of silicon halides with hydrogen in a furnace, the mixture being passed slowly through a heated tube of fused quartz located within the furnace. The silicon is deposited on the inner surface of the heated tube, and the tube is removed from the furnace from time-to-time to recover the silicon.

Semiconductor grade polycrystalline silicon is presently being produced by a chemical vapor deposition process by which trichlorosilane ($SiHCl_2$), or silicon tetrachloride ($SiCl_4$), is reduced with hydrogen on a hot silicon substrate at approximately 1200° C, according to the teachings of U.S. Pat. Nos. 3,053,638 and 3,240,623. The trichlorosilane and silicon tetrachloride are prepared in the processes from commercial or metallurgical grade silicon of the order of 98% purity, and they are purified by fractional distillation.

The prior art processes have demonstrated the technical and economic feasibility of producing high purity polycrystalline silicon of semiconductor quality by hydrogen reduction of and halosilanes. All commercial semiconductor grade polycrystalline silicon is presently being manufactured in accordance with the aforesaid chemical vapor deposition process, which employs hydrogen reduction of dichlorosilane or trichlorosilane and the deposition of silicon on an electrically heated silicon filament substrate. The silicon filament substrate is maintained at temperatures above 1000° C by electrical resistance heating, and the walls of the chamber enclosing the filament and reacting gases are maintained at temperatures of the order of 300° C to avoid the deposition of silicon thereon. The heated substrate increases in diameter as the process proceeds until it reaches a diameter of the order of 3 inches to 4 inches. The process is then discontinued until the substrate, which can be up to 4 feet in length, is removed from the chamber and replaced with a new starting rod which, for example, may be of $\frac{1}{8}$ - $\frac{1}{2}$ inch in diameter. Generally, the continuous vapor deposition reactor effluent gases are not recycled in the prior art process but are disposed by appropriate means.

Large amounts of electrical energy are required to operate the prior art continuous vapor deposition process of the order of 800–1000 kilowatt hours per kilogram of silicon produced. Capital and labor costs are also high due to the multiplicity of reaction chambers and silicon substrates required. The cost of production in a plant producing at a rate of 300–500 metric tons per year is in the range of $25.00–$30.00 per kilogram at the present time. The present-day market price is about $65.00 per kilogram.

The supply and demand for and of the semiconductor industry are in balance at the present time. There have been periods of severe shortages in recent years, and a potentially large new demand which could exceed the present semiconductor industry demand many times over is developing. The new demand is being created by the use of silicon solar cells for the photovoltaic conversion of solar energy into electrical energy. In order to realize this potentially new demand and to supply the demand, it will be necessary to reduce the manufacturing costs of semiconductor grade silicon to substantially less than $10.00 per kilogram, and to maintain silicon quality which will provide high efficiency of conversion of solar energy into electrical energy.

It is among the objects of the present invention to provide a process and apparatus to meet the aforesaid demands and criteria. The present invention provides a process which operates continuously; in which energy requirements are greatly reduced; and in which reactor effluent gases are recovered, separated and recycled. In particular, the hydrogen halide by-product of the process of the invention is recycled to generate purified halosilane feed stock for the reduction reactor, and hydrogen is also recovered and recycled. The only raw material consumed in the process of the invention is low cost metallurgical grade silicon.

The invention also provides a simple continuous flow reduction reactor in which the reactants have a short residence time of the order of 0.01–0.1 seconds. The reactants and nucleants are separately pre-heated in efficient radiant gas fired heat exchangers. The product is granular in the range of 10–100 mesh. The net result is a small tubular reactor with high volume capacity, continuous operation and continuous removal of the product, and representing much lower capital and operating costs than for the prior art continuous vapor deposition processes.

The continuous flow reduction process of the present invention represents a relatively low cost, high volume means for the continuous production of semiconductor grade silicon. In an embodiment to be described, impure (metallurgical grade) silicon is converted into a volatile halosilane intermediate compound according to the following chemical reactions (1) or (3):

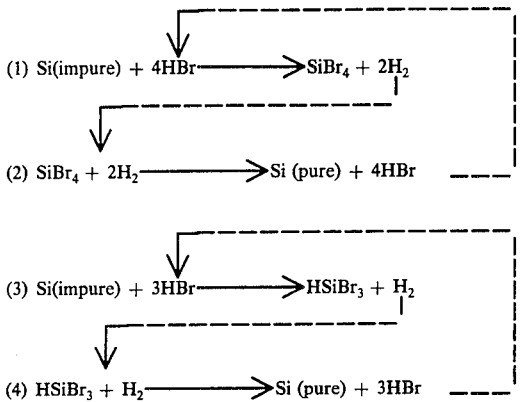

(1) Si(impure) + 4HBr ⟶ SiBr$_4$ + 2H$_2$ (2) SiBr$_4$ + 2H$_2$ ⟶ Si (pure) + 4HBr (3) Si(impure) + 3HBr ⟶ HSiBr$_3$ + H$_2$ (4) HSiBr$_3$ + H$_2$ ⟶ Si (pure) + 3HBr Impurities in the form of halides are separated from the halosilane intermediate in the process of the invention by fractional distillation and rejected. The purified volatile halosilane is then pre-heated and reduced in accordance with the chemical reactions (2) and (4) with purified pre-heated hydrogen in a continuous flow tubular reactor. Purified semiconductor grade polycrystalline silicon is separated and recovered from the reaction gas-solid stream. Reaction product hydrogen halide is separated from the reaction gas stream and recycled to convert more metallurgical grade silicon into crude intermediate silicon compounds and hydrogen. Thus the process of the invention consumes impure silicon, and it produces pure silicon, rejecting impurities as liquid or solid halides.

DETAILED DESCRIPTION OF THE PROCESS OF THE INVENTION

Figure 1:
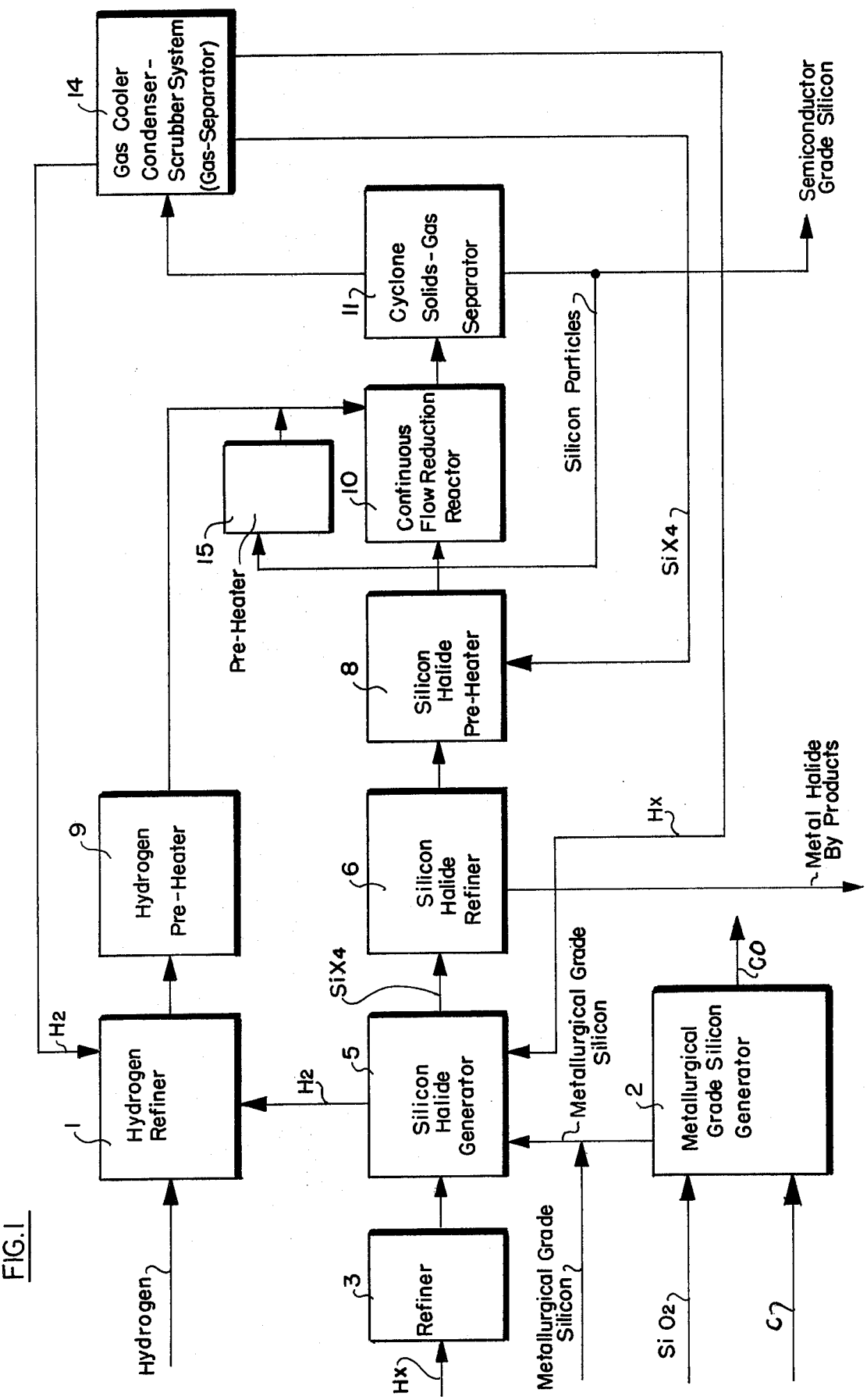
FIG. 1 is a schematic representation of the various steps of one embodiment of the process of the invention for the continuous production of high purity silicon by the vapor phase reaction of a halosilane intermediate, and hydrogen, pre-heated separately above the reaction temperature of the intermediate, in a continuous flow reduction reactor, and the separation of the reaction gases from the resulting silicon in a cyclone separator, the silicon being ejected continuously from the bottom of the separator, and the reaction gases being emitted from the top of the separator for re-use.

The invention provides a novel process and reactor for the continuous, high volume, low cost production of polycrystalline silicon of ultra-high purity by vapor phase reduction of a halosilane [SiH$_n$X$_{4-n}$] with hydrogen [H$_2$].

The silicon produced by the process of the invention, because of its uniform granular size and ultra-high purity is particularly suited for melting and drawing single crystal silicon for use in the manufacture of semiconductor devices, including integrated circuits, solar cells and the like.

In the practice of the invention, a halogen [X$_2$] or hydrogen halide [HX] is refined in a refiner 3, and is reacted with silicon containing small amounts of impurities in a silicon halide generator 5 at high temperature in the range of 350° C–800° C to produce crude halosilane [SiH$_n$X$_{4-n}$] intermediate such as silicon halide [SiX$_4$]. The silicon introduced to the generator 5 is, for example, metallurgical grade silicon.

Either commercial grade (98.5%) silicon, or higher purity (99.9%) silicon generated by the generator 2 may be used. The generator 2 may be an electrothermic silicon generator, which is known to the art. The higher purity hydrogen halide [HX] is obtained from the commercial product in refiner 3 by fractional distillation. The silicon halide from generator 5 is purified by fractional distillation in a refiner 6 in which impurities introduced into the process in the impure silicon are converted to metal halides and are eliminated as such by means of the fractional distillation. Refiner 6 may be of the type described in detail in U.S. Pat. No. 3,020,128 — Adcock et al.

The refined silicon intermediate compound [SiX$_4$] or [SiH$_n$X$_{4-n}$] is then pre-heated in pre-heater 8 to a high temperature in the range of 900° C–1100° C and injected into a continuous flow reduction reactor 10, of the type illustrated in FIG. 2, and which will be described in more detail subsequently. The pre-heater 8 may be a gas-fired type.

Hydrogen [H$_2$[ from commercial sources and recycled hydrogen from the halosilane generator 5 are refined to high purity in a conventional manner in hydrogen refiner 1 which likewise may be of the type described in the Adcock et al. U.S. Pat. No. 3,020,128. The purified hydrogen is then pre-heated to high temperature in the range of 900° C – 1500° C in a pre-heater 9, which may be similar to pre-heater 8, and the pre-heater hydrogen is injected into the continuous flow reduction reactor 10 where it is thoroughly mixed with the refined and separately pre-heated silicon intermediate compound in a manner which causes instantaneous chemical reaction. Pre-heated silicon particles of selected size and high purity derived, for example, from the output of cyclone solid-gas separator 11 are injected into the continuous flow reduction reactor 10 by means of the stream of hydrogen in a manner to be described subsequently.

The silicon particles may catalyze the vapor phase hydrogen reduction of the silicon intermediate but primarily are intended to promote nucleation and growth of the silicon while the reaction mass flows through the continuous flow reduction reactor 10. This phenomenon is due to the extensive high temperature surface presented by the silicon particles and the favorable Gibbs free-energy of the reacting species created in the continuous flow reduction reactor.

The solid-gas reaction mass stream after suitable retention time in the continuous flow reduction reactor 10 is conducted directly into a cyclone type solid-gas separator 11 wherein the silicon particles are collected and separated from the gas stream and then discharged from the bottom of the separator. The gas stream is discharged from the top of the cyclone separator 11 in a conventional manner and is then conducted to a gas cooler and condenser-scrubber system. Condensibles in the gas stream from the separator 11 consisting of unreacted [$SiH_nX_{4-n}$] and by product hydrogen halide are separated in system 14 by condensation, absorption and fractional distillation. [$SiH_nX_{4-n}$] so separated is then recycled to the pre-heater 8. The hydrogen halide [HX] so separated is conducted to the generator 5 where it is caused to react with more impure silicon to produce more intermediate and hydrogen. The [$H_2$] produced in the generator 5 is recycled to the hydrogen refiner 1, as mentioned above. The non-condensible gas in the gas stream issuing from the separator 11 is unreacted hydrogen [$H_2$] which, after scrubbing in cold [HX] liquid is recycled to the hydrogen refiner 1.

A small fraction, of the order of 10% of the hot silicon particles discharged from the cyclone separator 11, after suitable reduction in particle size, is recycled to pre-heater 15 and is then injected into the continuous flow reduction reaction by means of the pre-heated hydrogen stream.

The remaining hot silicon particles from the separator 11 are gradually added to a molten pool of silicon metal located below the separator and from which single crystal silicon is continuously withdrawn. An alternate method is to cool the silicon particles emerging from the separator 11 and accumulate them for future use.

Impurities introduced into the process in the raw materials employed being those principally in the impure silicon are as previously described converted principally into metal halides and are then separated from the crude halosilane by means of fractional distillation. The waste stream containing the metal halides can be discarded as such, or it can be treated in a conventional manner to recover the halides and the impurities. Final disposition of the impurities in whatever form depends largely on the quantities involved and the contained commercial values.

Figure 2:
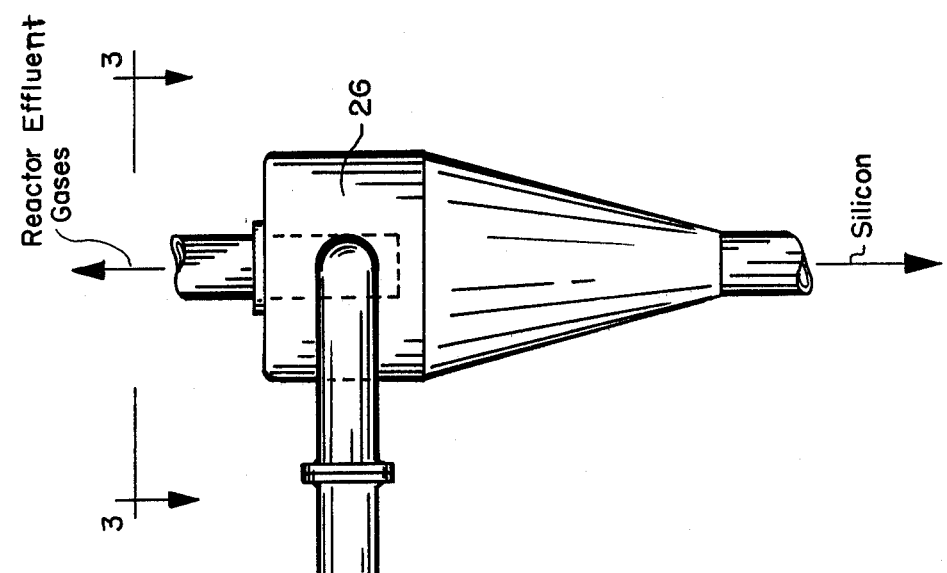
FIG. 2 is a schematic representation of a continuous flow reduction tubular reactor and associated cyclone separator which may be used in carrying out the process of the invention.
Figure 3:
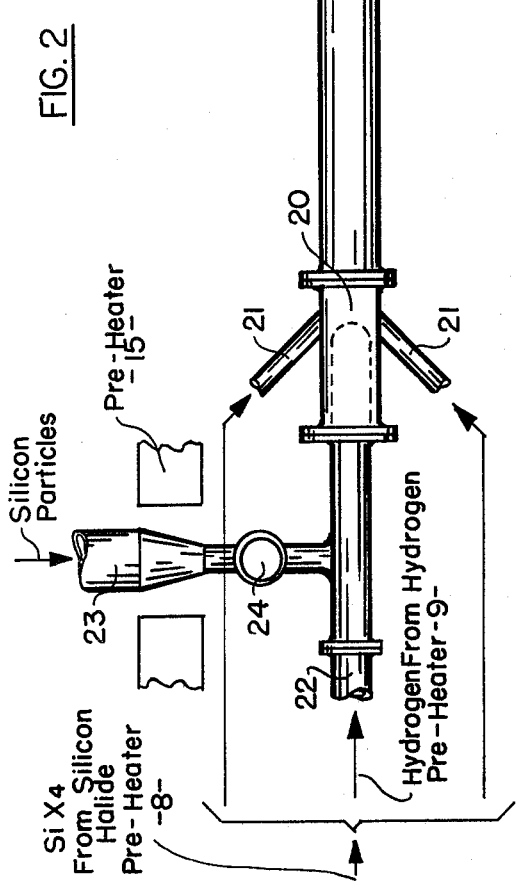
FIG. 3 is a top view of the separator of FIG. 2.
Figure 3:
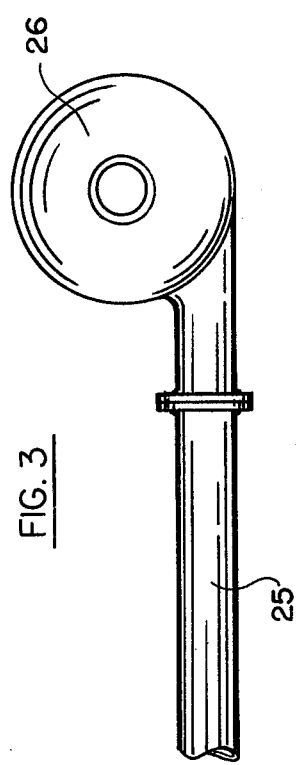

The continuous flow reduction reactor 10 and the cyclone solid gas separator 11 are shown schematically in FIGS. 2 and 3. The $SiX_4$ from the silicon halide pre-heater 8 is introduced to an injection mixer 20 through inlets 21. The hydrogen stream from the hydrogen pre-heater 9 is introduced to the mixer 20 through an inlet 22. The silicon particles from separator 11 are fed into a hopper 23, and the contents of the hopper are injected into the hydrogen stream through a rotary valve 24. The mixer 20 is coupled to a tubular reactor 25 which may, for example, be 4 inches to 6 inches in diameter and 20 feet to 40 feet in length. The remote end of the tubular reactor 25 is coupled to a cyclone separator 26 of known construction.

The apparatus of FIG. 2 provides for the continuous production of polycrystalline silicon by the high temperature vapor phase, reduction of the halosilane with hydrogen. The apparatus comprises means for separately pre-heating the halosilane vapors (pre-heater 8 of FIG. 1), of the hydrogen gas (hydrogen pre-heater 9 of FIG. 1) and of the silicon particles (pre-heater 15) to temperatures above 900° C. The apparatus also includes the tubular reactor 25 including mixer 20 which may be an injection type nozzle mixer in which the reactants and nucleant are injected and intimately mixed in a manner which causes instantaneous chemical reaction. The mixer is directly connected to the tubular reactor 25 in which nucleation and growth of silicon particles occurs. The apparatus also includes the cyclone type gas-solid separator 26 into which the reaction gases and silicon particles are conducted, and wherein the silicon particles are collected and separated from the gas stream.

The principal features of the continuous flow reduction reactor advantageously employed in the process of the invention are the separate pre-heating of the reactants and nucleants to high temperatures in the range of 900° C–1200° C, and the high velocity injection and mixing of the reactants and nucleating silicon particles. It is important that the design of the reactor, the temperatures and the reactant flow rate be such that the reactants, nucleant and products of reaction remain within the reaction zone for a period of time that is long enough to insure substantially the theoretical maximum conversion and to insure maximum growth of silicon particle size. Retention times of the order of 0.01 seconds to 0.1 seconds are generally sufficient.

It is also important to pre-heat the silicon particles to the highest serviceable temperature of about 1200° to promote nucleation and growth of silicon from the vapor phase onto the surface of the nucleant silicon particles. The high velocity turbulent flow of the reaction mass through the injection mixing nozzle 20 and tubular reactor 25 provides high volume flow in a small diameter tubular reactor. High velocity of the gas stream is necessary to maintain the silicon particles in a uniform state of suspension particularly when the tubular reactor 25 is disposed on a horizontal axis. In addition to performing an extensive nucleating surface, the silicon particles serve to scour the inner wall of the reactor and thus prevent deposition of silicon particles thereon. Silicon particle sizes in the range of −10 to +100 mesh are advantageously employed for the dual purpose of nucleant and scouring agent.

EXAMPLE 1

High purity silicon tetrabromide vapor from a continuous source of supply is fed at a rate of 0.49 liters per second into a pre-heater where it is heated to a temperature of 1090° C, and then into a 25 mm I.D. horizontal tubular reactor 6 meters long fitted with a mixing nozzle head and a cyclone type gas-solids separator, substantially as shown in FIG. 2. High purity hydrogen from a continuous source of supply is fed at a rate of 8.67 liters per second into a pre-heater where it is heated to a temperature of 1090° C, and then into the tubular reactor head where it intimately mixes and reacts with the pre-heated silicon tetrabromide vapor to form silicon and hydrogen bromide. Pure silicon particles in the range of −10 + 40 mesh (B.S.S.) from a continuous source of supply, and pre-heated to a temperature of 1100° C, are fed into the heated hydrogen stream at a rate of 0.3 grams per second as it enters the tubular reactor mixing head.

The entire gas-solids reduction mass continuously flows through the tubular reactor at high velocity of the order of 100 meters per second into the cyclone separator. Average residence time in the tubular reactor is about 0.06 seconds. High purity silicon particles are separated from the gas stream and discharged from the separator at a rate of 0.68 grams per second. This presents a net yield of 0.38 grams per second.

SUMMARY

|  |  |  |  |
|---|---|---|---|
|  | $SiBr_4$ | 0.49 | liters/sec |
|  | $H_2$ | 8.67 | liters/sec |
| nucleant | Si | 0.3 | grams/sec |
| product | Si | 0.68 | grams/sec |
| net | Si | 0.38 | grams/sec |

Pre-heat temperatures:
$SiBr_4$ — 1090° C
$H_2$ — 1090° C
Si — 1100° C
Velocity through reactor 100 meters/sec.

EXAMPLE 2

Using the same type of apparatus described in Example 1, high purity tribromosilane vapor from a continuous source of supply is fed into the pre-heater where it is heated to 955° C, and then into the tubular reactor at a rate of 0.49 liters per second. High purity hydrogen from a continuous source of supply is fed into the pre-heater where it is heated to 955° C, and then into the tubular reactor at a rate of 8.67 liters per second. Pure silicon particles in the range of −10 + 'mesh (B.S.S.) from a continuous source of supply, and pre-heated to a temperature of 1100° C, are fed into the heated hydrogen stream at a rate of 0.1 gram per second as it enters the tubular reactor mixing head. The entire gas-solids reaction mass flows through the tubular reactor at a rate of the order of 100 meters per second into the cyclone separator. High purity silicon particles are separated from the gas stream and discharged from the cyclone collector at a rate of 0.48 grams per second. This represents a net yield of 0.38 grams per second.

SUMMARY

|  |  |  |  |
|---|---|---|---|
|  | $HSiBr_3$ | 0.49 | liters/sec |
|  | $H_2$ | 8.67 | liters/sec |
| nucleant | Si | 0.1 | grams/sec |
| product | Si | 0.48 | grams/sec |
| net | Si | 0.38 | grams/sec |

EXAMPLE 3

Temperatures same as for Example 2. Velocity through reactor 100 meters/sec.

|  |  |  |  |
|---|---|---|---|
|  | $HSiCl_3$ | 29.4 | liters/min |
|  | $H_2$ | 520 | liters/min |
| nucleant | Si | 60 | grams/min |
| product | Si | 87.6 | grams/min |
| net | Si | 27.6 | grams/min |

EXAMPLE 4

Temperatures same as Example 1. Velocity through reactor 200 m/sec.

|  |  |  |  |
|---|---|---|---|
|  | $HSiCl_3$ | 58.8 | liters/min |
|  | $H_2$ | 1040 | liters/min |
| nucleant | Si | 120 | grams/min |
| product | Si | 147.8 | grams/min |
| net | Si | 27.8 | grams/min |

While particular embodiments of the process of the invention have been shown and described, modifications may be made. It is intended in the claims to cover the modifications which come within the true spirit and scope of the invention.

What is claimed is:

1. A process for the production of high purity silicon comprising: pre-heating hydrogen to a temperature range of substantially 900° C–1200° C; separately pre-heating a halosilane to a temperature range of substantially 900° C–1200° C at which the pre-heated halosilane will react in vapor phase with the separately pre-heated hydrogen; injecting the separately pre-heated halosilane and the separately pre-heated hydrogen as continuous streams into a mixer wherein the pre-heated halosilane vapor and the pre-heated hydrogen gas are intimately mixed to produce chemical reaction in a continuous vapor stream; reducing the pre-heated halosilane with the pre-heated hydrogen in the continuous vapor stream to cause silicon to be produced in the vapor stream; injecting a high velocity stream of silicon particles into the mixer to act as nuclei for the silicon produced during the reducing step; pre-heating the stream of silicon particles to a temperature range of substantially 900° C–1200° C prior to injecting the stream into the mixer; and separating the silicon from the vapor stream.

2. The process defined in claim 1, in which the halosilane is tribromosilane ($SiHBr_3$).

3. The process defined in claim 1, in which the halosilane is silicon tetrabromide ($SiBr_4$).

4. The process defined in claim 1, and which includes the step of reacting hydrogen halide with metallurgical grade silicon to form the halosilane.

5. The process defined in claim 6, in which the hydrogen halide is hydrogen bromide.

6. The process defined in claim 4, and which includes the steps of recovering the vapor stream after the separation of the silicon, separating hydrogen halide from the recovered vapor stream, and reacting the separated hydrogen halide with metallurgical grade silicon to form the halosilane and to recover hydrogen.

7. The process defined in claim 1, and which includes the step of reacting a halogen with metallurgical grade silicon to form the halosilane.

8. The process defined in claim 7, in which the halogen is bromine (Br).

9. The process defined in claim 7, and which includes the steps of recovering the vapor stream after the separation of the silicon, separating the hydrogen halide from the recovered vapor stream, and reacting the separated hydrogen halide with metallurgical grade silicon to form the halosilane and to recover hydrogen.

10. The process defined in claim 1, in which the halosilane is silicon halide.

11. The process defined in claim 1, in which the silicon particles are injected as a common stream with the hydrogen into the mixer.

* * * * *